United States Patent Office 3,398,363
Patented Aug. 20, 1968

3,398,363
EQUIPMENT TESTING SYSTEMS FOR VISUALLY INDICATING FAULTS OCCURRING AT ANY OF A NUMBER OF TESTING POINTS
Wilfrid Sinden Mortley, Great Baddow, Essex, England, assignor to The Marconi Company Limited, London, England, a British company
Filed Sept. 30, 1963, Ser. No. 312,488
Claims priority, application Great Britain, Oct. 2, 1962, 37,231/62
2 Claims. (Cl. 324—73)

ABSTRACT OF THE DISCLOSURE

A testing apparatus for testing and indicating the location of faults in a complex multi-circuit electronic equipment wherein at each of a number of test points in the electronic equipment a device is provided which exhibits a change in output when a fault occurs at the test point. The outputs from the devices are cyclically and repeatedly sampled and the sampled outputs are applied as intensity modulation to a cathode ray tube, the electron scanning beam of which is scanned across the display screen in synchronism with the sampling of the testing devices in a television raster pattern of parallel lines so that a plurality of points, arranged in rows and columns, appear on the display screen. Each point is associated with a different one of the testing devices. The normal output of the testing devices is such that the points on the display screen are of low illumination except when a fault occurs which causes one of the testing devices to provide an increased output whereupon the spot with which that testing device is associated brightens up.

---

Figure 1:
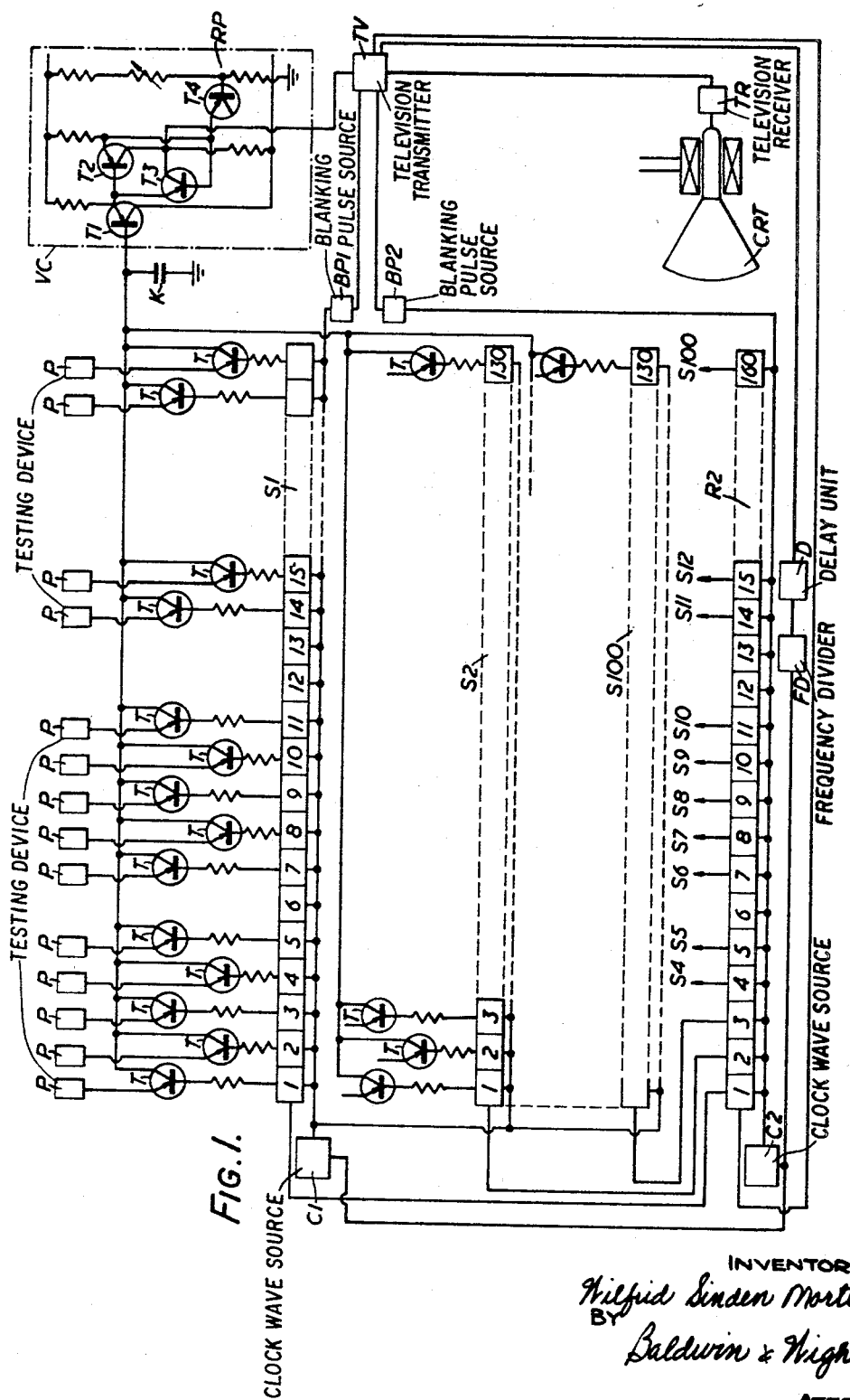

This invention relates to equipment testing systems.

Modern technological development in certain fields, notably in the electronic field, has led to the production of highly complex equipments comprising very large numbers of individual circuits the failure of any one of which may result in breakdown of the equipment. Thus, for example, certain radar equipments employing computers for the evaluation and utilisation of echo signals may comprise many thousands of circuits all of which must, for proper operation of the equipment, be fault free. Other examples of highly complex equipments are to be found in other systems employing computers, in computers themselves and in tele-communication, including telephony. In all such complex equipments the problem arises of locating a fault if one occurs and, as is generally recognized, it is quite impractical to wait until a fault occurs and then locate it by the ordinary method, employed in simpler equipments, of individual testing of the different circuits by test gear applied to one circuit after another until the fault is found. It is general, therefore, in such complex equipment, to incorporate in the equipment itself continuously running test gear which makes test at a large number of test points in the equipment and which, on the occurrence of a fault, indicates where the fault is. Various forms of such continuously running test gear have been proposed or are in use. Usual practice is to provide, at each test point, a device the output from which changes when a fault occurs at the test point to which it is connected and to use this changed output to operate an associated indicator—for example, to light an electric lamp—to show where the fault is, there being customarily as many indicators as there are test points. Continuously running test gear as so far proposed or in use is expensive, complex and bulky and the present invention seeks to provide improved continuously running automatic test gear without these defects.

According to this invention testing apparatus for testing and indicating the location of faults in a complex multi-circuit equipment comprises at each of a plurality of test points in said equipment, a testing device adapted to provide an output which changes in characteristic predetermined manner when a fault occurs at the test point with which it is associated; means for cyclically and repeatedly sampling the outputs from said testing devices; a cathode ray display tube; means synchronised with the cyclic sampling of the outputs from said testing devices, for causing the ray in said tube to scan the display screen thereof in a pre-determined pattern and in such manner that at each time the output from any particular testing device is sampled the ray in said tube is at a particular point in its scan characteristics of the testing device in question; and means for utilizing the samples to modulate the intensity of the scanning ray to produce on the screen of the tube a visible indication which is indicative of the existence of a fault and the position of which, in the pattern, is indicative of the location of the fault.

Preferably, the scanning pattern is a pattern of parallel lines like that of a television raster.

Preferably also means are provided for suppressing the cathode ray during scanning except at times when samples are utilized to modulate the same and the modulation is such that the ray is of relatively low pre-determined intensity when modulated in accordance with a sample taken from a testing device the output from which corresponds to "no fault" at the test point with which it is associated and of substantially greater intensity when modulated in accordance with a sample taken from a testing device the output from which corresponds to "fault" at the test point with which it is associated.

Preferably again, means are provided for suppressing the cathode ray during scanning of pre-determined scanning lines in the television raster and also at pre-determined times during individual scanning lines during which modulation is applied to the ray, the lines during which the ray is suppressed and the times for which the ray is suppressed during such individual lines being so chosen as to divide the display into a separated columns of dots resulting from modulation, said dots lying also in separated rows divided by horizontal spaces into separated successions of rows. In a preferred form of display each row of dots comprises separated groups each of five dots and separated successions each of five lines.

In one way of carrying out the invention each testing device is connected to a common condenser through a transistor connected to act as a switch and the transistors are rendered conductive in turn by voltages applied thereto by multi-stage shift registers actuated in synchronised relation with scanning action in the cathode ray and display tube. Preferably the voltage across the condenser is applied to a voltage comparator adapted to produce one or the other of two substantially different output voltages in dependence upon whether the input thereto is within or substantially outside of a pre-determined range of voltage, and the output from said comparator is utilised to modulate a television carrier wave transmitter supplying signals to a television receiver the output of which is fed to the cathode ray display tube.

Figure 2:
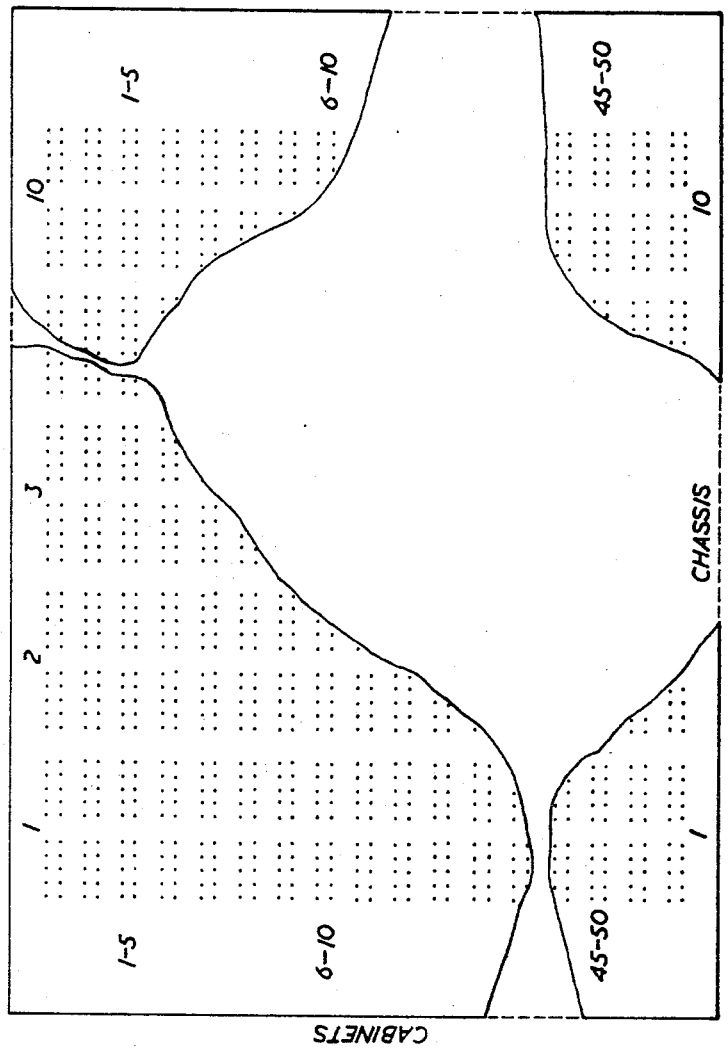

The invention is illustrated in and further explained in connection with the accompanying drawings in which FIG. 1 is a simplified diagram of one embodiment of the invention and FIG. 2 is a diagrammatic representation showing the fault-location indicating diplay given by the embodiment of FIG. 1.

The embodiment of FIG. 1 is shown as adapted to indicate the position of faults which may occur at any of up to 10,000 test points. In this particular case, which is given purely by way of example, it is assumed that the equipment to be continuously monitored for faults comprises 50 cabinets each housing 10 chassis on each of which there are 10 printed circuit boards making 5,000 printed circuit boards in all and that it is required to test the input and output of each board for possible faults so that there are 10,000 test points. Before describing the embodiment of FIG. 1 it is convenient first to describe the fault-location indicating display which is given thereby.

This display is given by a cathode ray tube the screen of which is represented diagrammatically, broken away, in FIG. 2. In this display each of the 10,000 test points is represented by aluminous dot each in a different position representative of the location, in the equipment under test, of a different test point. So long as there is no fault all the luminous dots are of the same brightness which is chosen to be of a low intensity. When a fault is found at any test point the dot in the position corresponding to that test point is considerably brightened thus calling attention to the fault and showing the location of the test point in question.

The cathode ray in the display tube is deflected to scan the screen, television fashion, in horizontal lines, preferably (though not necessarily) without inter-lacing. Non-interlaced scanning will be assumed. In order to be able to use, as far as possible, already designed components available in present British television receiver practice, the number of lines per field is chosen to be that at present employed in one field of the British interlaced 405 line system, i.e. 202 lines. As will be seen later, however, this gives more lines than is required for the display now to be described, for which only 160 lines are used. The surplus lines may be left at top or bottom of the display area (or both) and the scanning ray is not brightened while they are being scanned. During 100 only of the 160 useful lines test point indicating dots are produced. More in detail, and as will be seen from FIG. 2, test point location indicating dots are produced in pairs of successive lines with each pair separated by a line without dots until ten lines in five pairs are produced, followed by two successive lines without dots, followed by five more pairs of lines of dots, each pair separated by a line without dots, followed by two more successive lines without dots . . . and so on. In this way the lines of dots are paired with a horizontal space between each pair, the spaces following the fifth, tenth, fifteenth . . . and so on, pairs being twice as high as the other inter-pair spaces.

As will also be seen from FIG. 2 the dots in the lines of dots are grouped in groups of five. In each line five equally spaced dots are produced followed by a gap equal to one dot, followed by another group of five, followed by a gap equal to two dots, followed by another group of five, followed by a gap equal to one dot, followed by another group of five, followed by a gap equal to two dots . . . and so on. Each line of dots is thus made up of groups of five separated by spaces, alternate spaces being of half the width of the remaining spaces.

The result is to produce an easily read display in which the dots appear in pairs of columns each five dots wide, successive pairs being separated by relatively wide vertical spaces. The dots in each pair of these columns are allocated to a different chassis which may be designated in any convenient way, for example as shown in FIG. 2 by numbers at the head and foot of the spaces between the columns of a pair. Also the positions along the lines of the different dots in the columns of a pair of columns are allocated to the different printed circuit boards (of which there are ten) in the chassis appropriate to that pair of columns, this grouping of the dots in groups of five along each line facilitating board identification. The dots also appear in pairs of lines with relatively high horizontal spaces between each successive set of five pairs. The dots in each pair of lines are allocated to a different cabinet and the cabinets allocated to each set of five pairs are shown as designated by numbers alongside the middle pair of each set. Thus the first five pairs of lines of dots are allocated to cabinets Nos. 1 to 5 respectively and this is indicated, for example, by the inscription 1–5 appearing in FIG. 2 to the left of the third pair of lines in the first set of five pairs of lines of dots. In addition, dots in the first line of any pair of lines of dots are allocated to inputs and those in the second line of any pair are allocated to outputs.

As already stated a fault at any test point is indicated by a brightening of the dot allocated to that point and it will be at once apparent how easy it is with this display, to identify the location of any fault. In FIG. 2 a brightened dot is indicated in the lower line of the eighth pair of lines at the right hand end of the second vertical column. Because this dot is in the lower line of a pair it indicates an output fault; because it is in the tenth dot position (along the line) in the pair of columns headed 1 it is in the tenth board of chassis No. 1; and because it is in the eighth pair of lines it is in chassis No. 1 of cabinet No. 8. It is thus seen at a glance that there is an output fault in the tenth board of the first chassis of the eighth cabinet.

FIG. 1 shows an embodiment of this invention which will produce on the screen of the cathode ray tube CRT a display as above described in connection with FIG. 2. At each of the 10,000 test points, is a device which may be of any form known per se and adapted to the circuit at the point to be tested thereby, which will produce a D.C. output voltage of pre-determined amount (say, 1 volt positive) if the circuit at that test point is functioning correctly but will depart from this voltage if the circuit has a fault. A number (14 only) of these devices are shown and represented by the blocks P. These devices form per se no part of this invention and accordingly will not be described herein. Each device is connected to its own transistor T. These transistors are of the known so-called symmetrical transistor type and are used as sampling transistors. As is well known, the symmetrical transistor is one which has a base and a pair of other electrodes of which that one which, at any given moment, has a larger voltage applied thereto than is applied to the other, acts as the emitter the other electrode of the pair then acting as the collector. One of the said pair of electrodes of each transistor is connected to a different one of the devices P and the remaining electrodes of the pairs are connected together and to a storage condenser K.

The transistors are caused to act as sampling devices to scan the devices P by means of a shift register unit composed of 100 shift register sections (actually each a register) each of 130 stages. Three of these sections are indicated at S1, S2 and S100 respectively and the successive stages in the sections are indicated by the numbers therein. Stages 1 to 15 and 129 and 130 of section S1 are referenced in this way in FIG. 1, as are stages 1, 2, 3, and 130 of section S2 and stage 130 of section S100. Each section is triggered by a triggering impulse applied to its first stage. The way in which these impulses are obtained will be described later. The shift registering unit has associated therewith, as in the usual way, a so-called clock wave source C1 which has a frequency of 1 mc./s. and gives a shift from stage to stage at alternate half waves. The clock wave source is synchronised as will later be described. Certain of the stages of the shift register unit are connected to the bases of the different transistors T. In each section the first five stages 1 to 5 are connected to the bases of five transistors, the next section 6 is left unconnected, the next five stages 7 to 11 are connected to transistors, the next two stages 12 and 13 are left unconnected . . . and so on, there being thus groups of five stages connected to transistors and, between successive groups, either one or two unconnected stages, there being two unconnected stages following each ten connected stages. When any stage of the register unit connected to a transistor operates it causes that transistor to apply to the condenser K the voltage from the device P connected to that transistor. The voltage across condenser K will accordingly remain at 1 volt so long as there is no fault but if a fault is present at any test point when the output from the device P at that point is sampled by the associated transistor T, the voltage across the condenser K will change from the "correct" value of 1 volt.

The voltage across condenser K is fed to an arrangement within the chain line block VC. This arrangement is designed to produce a pre-determined output voltage when the input voltage thereto is within a pre-determined range —say ± 15%—centred on the "correct" value (1 volt) but which produces a widely different output voltage if the input voltage changes to a value outside that range. This arrangement VC comprises four transistors T1, T2, T3 and T4 of which T1 and T4 are merely emitter-followers. The base of T4 is connected to a reference potential point RP which is an intermediate point on a potentiometer connected across a supply potential source—as shown between a terminal at +6 volts and zero (earth) volts. The voltage across condenser K is applied to the base of transitsor T1. The collector of T2 and T3 are connected to a —6 volt terminal through a resistance and to the output lead of the unit VC. The base of T2 is connected to the emitters of T1 and T3 and through a resistance to the +6 volt terminal. The base of T3 is connected to the emitters of T2 and T4 and through a resistance to the said +6 volt terminal. The arrangement is such that when the input voltage applied to the base of T1 is within the predetermined voltage range, the output voltage at the common collector lead of T2 and T3 is (substantially) —6 volts. If the input voltage falls below this range, T2 is backed off and T3 is conductive; if the input voltage increases above this range T3 is backed off and T2 is conductive. In either event the output lead voltage is caused to rise rapidly towards zero volts with small decreases or increases of input voltage outside the range. The potentiometer may be adjustable as shown to permit of adjustment of the potential at RP.

The output from unit VC is fed to a non-interlaced television transmitter unit TV of known design and arrangement with provision of the usual line and field time bases and television signal blanking means not separately shown. This transmitter provides a television signal modulated carrier wave output which is fed to a normal non-interlaced television receiver TR the video output of which modulates the beam in the display cathode ray tube CRT. The television transmitter and receiver are so arranged that when the output from unit CV is —6 volts, corresponding to "no fault," the television signal (if not blanked at the time considered) is such as to result in a low intensity of the beam in the tube but when the output from said unit corresponds to "fault," the television signal (again if not blanked at the time) is such that the ray in the tube is strongly brightened.

The tube has the customary line and field time base drives (not shown) which are synchronised with the transmitter in the usual way by the signals fed therefrom. Line frequency signals are fed via a suitable delay circuit D to a divide-by-two frequency divider FD the output from which synchronises the 1 mc./s. clock wave source C1 already referred to and also synchronises a 5 kc./s. clock wave source C2 for a second shift register unit R2. This register consists of 160 stages. Outputs are taken from only 100 of these stages. More in detail, outputs are taken from the first five stages then there is an unconnected stage, then there are five more stages with connected outputs, then there are two unconnected stages, then there are five more stages with connected outputs followed by one unconnected stage followed in turn by five more connected stages, then two unconnected stages . . . and so on. As will be seen this gives 100 outputs and these supply the input trigger pulses to the first stages of the 100 sections S1 to S100 respectively of the first register unit as indicated by the appropriate references in FIG. 1. The trigger pulse to the first stage of the second register unit R2 of field frequency and is taken from the transmitter unit TV.

In order to ensure that the displayed dots, whether of strong or low brightness (according as to whether there are faults or not) shall appear as separate dots, the television transmitter TV is subjected to blanking in known manner between dots. In the illustrated embodiment this is done by taking outputs from the clock-wave sources C1 and C2 to suitable blanking pulse sources BP1 and BP2 which blank the television wave form at the proper times.

It will be seen that the purpose of the unconnected stages in the two shift register units—that composed of the sections S1 to S100 and the register unit R2—is to provide the horizontal spaces between pairs of lines and the vertical spaces between columns in the display shown in FIG. 2. The devices P of FIG. 1 are of course allocated to the 10,000 test points in the manner required by the display of FIG. 2 so that, as the cathode ray tube scans through the television raster, the ray therein is controlled in brightness, at any instant in dependence upon the output of that device P which is connected at that instant to the test point identified by the momentary position of the scanning ray.

If desired, means may be added for giving an audible or other warning if a fault appears. This may be done in any of a variety of different ways. Thus, for example, a transistor (not shown) backed by an applied negative voltage to be normally non-conductive, may be connected to the output lead of the unit VC so that, if the voltage on this lead changes by a pre-determined amount from the "correct" value of —6 volts, the transistor becomes conductive and actuates a self-maintaining relay circuit to operate an alarm which will continue to sound until the self-maintaining circuit is manually opened. Provision may also be made, if desired, for the recording of faults. Thus, for example, the above mentioned transistor employed for actuating a self-maintaining relay circuit to operate an alarm, or a similarly connected transistor, may be employed to actuate a relay to operate a camera which is positioned to take a photograph of the display tube screen and an adjacent clock face.

It will be apparent that the embodiment illustrated will display faults at any number of test points up to 10,000 and if, in any particular case, there are less than 10,000 test points to be dealt with the extra, unrequired transistors T and register stages can be left unconnected or omitted.

I claim:

1. Testing apparatus for testing and indicating the location of faults in a complex multi-circuit equipment, said apparatus comprising at each of a plurality of test points in said equipment, a plurality of testing devices each adapted to provide an output which changes when a fault occurs at the test point with which it is associated; means for cyclically and repeatedly sampling the outputs from said testing devices; a cathode ray display tube; means synchronised with the cyclic sampling of the outputs from said testing devices, for causing the ray in said tube to scan the display screen thereof in a pre-determined pattern comprising a series of points disposed along generally parallel lines and in such manner that at each time the output from any particular testing device is sampled the ray in said tube is at a particular one of said points in its scan characteristic of the testing device in question; and means for utilising the samples to modulate the intensity of the scanning ray to produce on the screen of the tube a visible indication which is indicative of the existence of a fault and the position of which, in the pattern, is indicative of the location of the fault, each of said testing devices being connected to a common condenser through a transistor connected to act as a switch, said transistors being rendered conductive in turn by voltages applied thereto by multi-stage shift registers actuated in synchronized relation with scanning action in the cathode ray display tube.

2. Apparatus as claimed in claim 1 wherein the voltage across the condenser is applied to a voltage comparator adapted to produce one or other of two substantially different output voltages in dependence upon whether the input thereto is within or substantially outside of a predetermined range of voltage, and the output from said comparator is utilised to modulate a television carrier wave transmitter supplying signals to a television receiver the output of which is fed to the cathode ray display tube.

References Cited
UNITED STATES PATENTS

| | | | |
|---|---|---|---|
| 2,878,450 | 3/1959 | Rabier | 324—73 X |
| 2,937,369 | 5/1960 | Newbold | 324—111 X |
| 3,179,883 | 4/1965 | Farrow | 324—73 |

RUDOLPH V. ROLINEC, *Primary Examiner.*

E. L. STOLARUN, *Assistant Examiner.*